(12) United States Patent
Lin

(10) Patent No.: US 8,352,171 B2
(45) Date of Patent: Jan. 8, 2013

(54) AUXILIARY SATELLITE POSITIONING SYSTEM AND METHOD THEREOF

(75) Inventor: Hung-Yi Lin, Taipei (TW)

(73) Assignee: MiTAC International Corp., Taoyuan (TW)

( * ) Notice: Subject to any disclaimer, the term of this patent is extended or adjusted under 35 U.S.C. 154(b) by 1355 days.

(21) Appl. No.: 11/651,507

(22) Filed: Jan. 10, 2007

(65) Prior Publication Data

US 2007/0162230 A1 Jul. 12, 2007

(30) Foreign Application Priority Data

Jan. 11, 2006 (TW) ................................ 95101072 A

(51) Int. Cl.
*G01C 21/00* (2006.01)

(52) U.S. Cl. ........ 701/213; 701/400; 701/409; 701/468; 701/469; 701/470; 701/471; 701/472; 701/474; 701/475; 701/476; 701/477; 701/478; 701/479; 701/480; 701/481; 701/482; 701/483; 701/484; 701/485; 701/486; 701/513; 701/526

(58) Field of Classification Search .. 340/539.1–539.13, 340/988–995.28; 342/350, 352, 357.01, 342/357.06–357.15; 701/200–215
See application file for complete search history.

(56) References Cited

U.S. PATENT DOCUMENTS

| | | | | |
|---|---|---|---|---|
| 5,430,657 A * | 7/1995 | Kyrtsos | ........................ | 701/469 |
| 6,275,185 B1 * | 8/2001 | Loomis | .................... | 342/357.46 |
| 6,313,787 B1 * | 11/2001 | King et al. | ............... | 342/357.42 |
| 6,429,808 B1 * | 8/2002 | King et al. | ............... | 342/357.44 |
| 6,778,134 B2 * | 8/2004 | Dooley et al. | ............. | 342/357.62 |
| 6,907,224 B2 * | 6/2005 | Younis | ......................... | 455/12.1 |
| 7,064,706 B2 * | 6/2006 | King et al. | ............... | 342/357.44 |
| 7,133,683 B1 * | 11/2006 | Budney et al. | ............. | 455/456.1 |
| 7,277,049 B2 * | 10/2007 | Korneluk et al. | ........ | 342/357.42 |
| 7,321,776 B2 * | 1/2008 | Camp et al. | ................ | 455/456.1 |
| 7,377,835 B2 * | 5/2008 | Parkulo et al. | ................ | 455/521 |
| 7,869,948 B2 * | 1/2011 | Han | .............................. | 701/471 |
| 2002/0098849 A1 * | 7/2002 | Bloebaum et al. | ............ | 455/456 |
| 2002/0188403 A1 * | 12/2002 | LaMance et al. | ............ | 701/213 |
| 2003/0085837 A1 * | 5/2003 | Abraham | ................... | 342/357.1 |
| 2004/0147223 A1 * | 7/2004 | Cho | ............................. | 455/41.2 |

(Continued)

FOREIGN PATENT DOCUMENTS

TW 487806 5/2002

(Continued)

OTHER PUBLICATIONS

Office Action from Taiwanese Patent Office for a corresponding application, issued on Jun. 8, 2010.

*Primary Examiner* — Jonathan M Dager

(74) *Attorney, Agent, or Firm* — Wang Law Firm, Inc.; Li K. Wang; Stephen Hsu

(57) ABSTRACT

An auxiliary satellite positioning system is applied to a first satellite positioning apparatus. The auxiliary positioning system includes a detection module, a transmission interface and a positioning module. A second satellite positioning module having a satellite data can be detected by the detection module via a wireless transmission protocol. The satellite data can be transmitted by the transmission interface to the first satellite positioning module from the second satellite positioning module. The satellite data can be used by the positioning module to implement a satellite positioning action.

8 Claims, 8 Drawing Sheets

U.S. PATENT DOCUMENTS

| | | | |
|---|---|---|---|
| 2004/0193372 A1* | 9/2004 | MacNeille et al. | 701/213 |
| 2004/0252053 A1* | 12/2004 | Harvey | 342/357.15 |
| 2004/0263386 A1* | 12/2004 | King et al. | 342/357.06 |
| 2005/0038601 A1* | 2/2005 | Dentinger et al. | 701/213 |
| 2005/0201301 A1* | 9/2005 | Bridgelall | 370/254 |
| 2005/0240345 A1* | 10/2005 | Yamamoto et al. | 701/213 |
| 2006/0022048 A1* | 2/2006 | Johnson | 235/462.1 |
| 2006/0125685 A1* | 6/2006 | Jeon et al. | 342/357.09 |
| 2006/0181452 A1* | 8/2006 | King et al. | 342/357.02 |
| 2006/0181453 A1* | 8/2006 | King et al. | 342/357.06 |
| 2006/0208942 A1* | 9/2006 | Vyas et al. | 342/357.09 |
| 2006/0250304 A1* | 11/2006 | Mo et al. | 342/357.15 |
| 2006/0282216 A1* | 12/2006 | Robbins | 701/214 |
| 2007/0110010 A1* | 5/2007 | Kotola et al. | 370/338 |
| 2007/0192029 A1* | 8/2007 | Riben et al. | 701/213 |
| 2007/0200752 A1* | 8/2007 | van Diggelen et al. | 342/357.01 |
| 2007/0225016 A1* | 9/2007 | Jendbro et al. | 455/456.1 |
| 2008/0103689 A1* | 5/2008 | Graham et al. | 701/206 |

FOREIGN PATENT DOCUMENTS

TW  567334  12/2003

* cited by examiner

AUXILIARY SATELLITE POSITIONING SYSTEM AND METHOD THEREOF

FIELD OF THE INVENTION

The present invention generally relates to an auxiliary positioning system and method thereof, and more specifically relates to a satellite positioning apparatus that receives a satellite data of another satellite positioning apparatus to expedite the speed of a cool start of the satellite positioning apparatus.

BACKGROUND OF THE INVENTION

Global Positioning System (GPS) was originally intended for military use and is now expanded for civil use and provided for international aviations, maritime affairs, rescues, and motor vehicle guidance, etc. In an airplane, we usually can watch the reports of speed, direction, map and distance to destiny from a television display, and it is one of the applications of the global positioning system.

The positioning method of a GPS mainly receives a signal directly from three or more satellites and uses the time of a two-way signal reflection for its calculation. Referring to FIG. 1 for the schematic view of a prior art global positioning system, the time of the two-way reflection between the satellite 11 and the positioning apparatus 12 is used to calculate the distance between the satellite 11 and the positioning apparatus 12, and a trigonometric positioning technique can be used to locate the position of a user. If it is necessary to find the height of the user's location, four or more satellites will be needed.

Although the application of the satellite positioning apparatus is very convenient, yet it is necessary to search the satellite for a cold start of the satellite positioning apparatus and receive a satellite ephemeris data and a satellite orbit information for the positioning. In general, users have to wait for a while before using the apparatus, and thus causing tremendous trouble to the users who are busy or have an urgent need for its use.

To overcome the foregoing shortcomings and expedite the cold start of the satellite positioning apparatus, the inventor of the present invention based on years of experience in the related field to conduct extensive researches and experiments, and finally invented an auxiliary satellite positioning system and method as a method or a basis for achieving the aforementioned objective.

SUMMARY OF THE INVENTION

Therefore, it is a primary objective of the present invention to provide an auxiliary satellite positioning system and method thereof, and more particularly an auxiliary satellite positioning system and a method that receive the satellite data of another satellite positioning apparatus to expedite a cold start of the satellite positioning apparatus.

To achieve of the foregoing objective, the auxiliary satellite positioning system applied to a first satellite positioning apparatus includes a detection module, a transmission interface and a positioning module. A wireless transmission protocol is used for searching a second satellite positioning apparatus containing satellite data through the detection module, and the positioning module uses the satellite data to implement a satellite positioning action.

In the present invention, the auxiliary satellite positioning system and method search the second satellite positioning apparatus having a satellite data and receiving the satellite data transmitted from the second satellite positioning apparatus, and thus greatly reducing the time required for a cold start of the first satellite positioning apparatus, and achieving the effect of expediting the cold start of the satellite positioning apparatus.

To make it easier for our examiner to understand the objective of the invention, its innovative features and performance, a detailed description and technical characteristics of the present invention are described together with the drawings as follows.

DETAILED DESCRIPTION OF THE PREFERRED EMBODIMENTS

Figure 1:
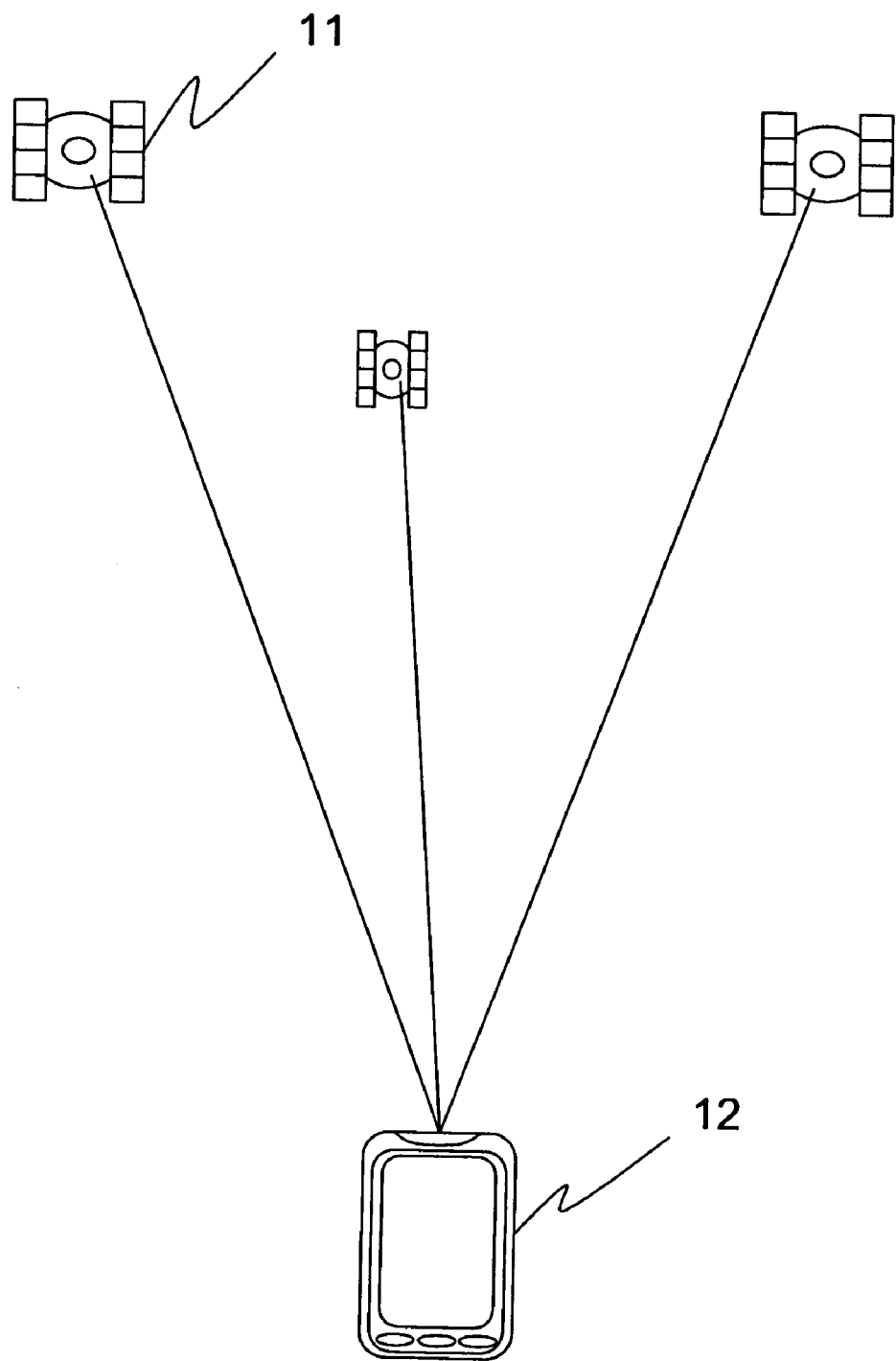
FIG. 1 is a schematic view of a prior art global positioning system.

Referring to the related figures for the auxiliary satellite positioning system and method according to a preferred embodiment of the present invention, wherein the same elements are described by the same reference numerals.

Figure 2:
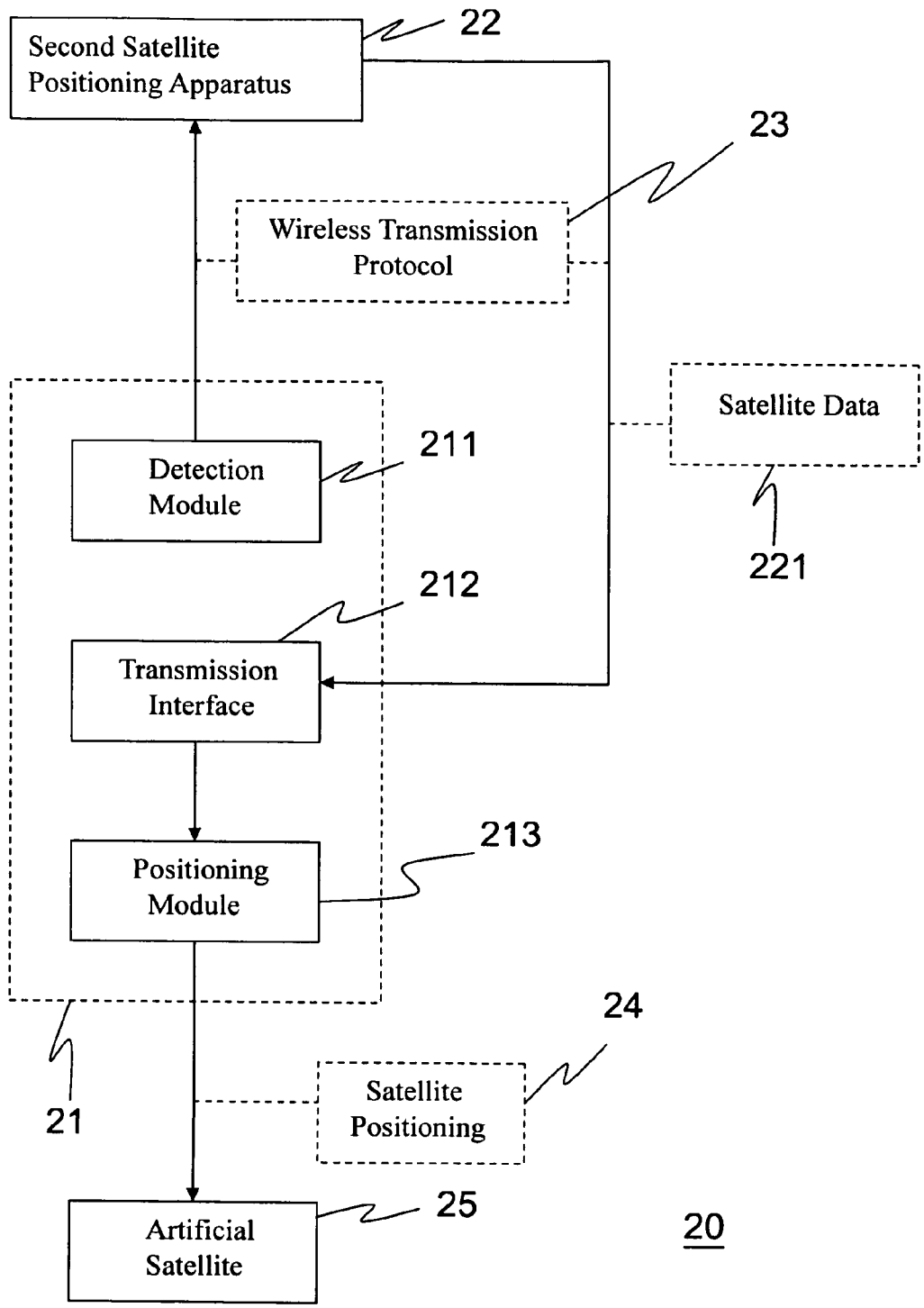
FIG. 2 is a block diagram of an auxiliary satellite positioning system of the present invention.

Referring to FIG. 2 for the block diagram of an auxiliary satellite positioning system of the invention, the an auxiliary satellite positioning system 20 is applied for a first satellite positioning apparatus 21 and includes a detection module 211, a transmission interface 212 and a positioning module 213. The detection module 211 uses a wireless transmission protocol 23 to search a second satellite positioning apparatus 22 having a satellite data 221, and the transmission interface 212 transmits the satellite data 221, and the positioning module 213 uses the satellite data 221 and an artificial satellite 25 to implement a satellite positioning 24.

The wireless transmission protocol 23 is preferably a Bluetooth technology, a wireless LAN 802.11 (Wi-Fi) technology, an Infrared Data Association (IrDA) technology, a near field communication (NFC) technology or an ultra wideband (UWB) wireless communication technology; the first satellite positioning apparatus 21 and the second satellite positioning apparatus 22 are preferably portable satellite positioning apparatuses; and the positioning module 213 is preferably a global positioning system (GPS) module. The satellite data 221 includes an ephemeris data and a satellite orbit information, and the transmission interface 212 further includes a cable transmission interface for transmitting the satellite data 221 through a connecting line. It should be noted that the first satellite positioning apparatus 21 is also equipped with a GPS module.

Figure 3:
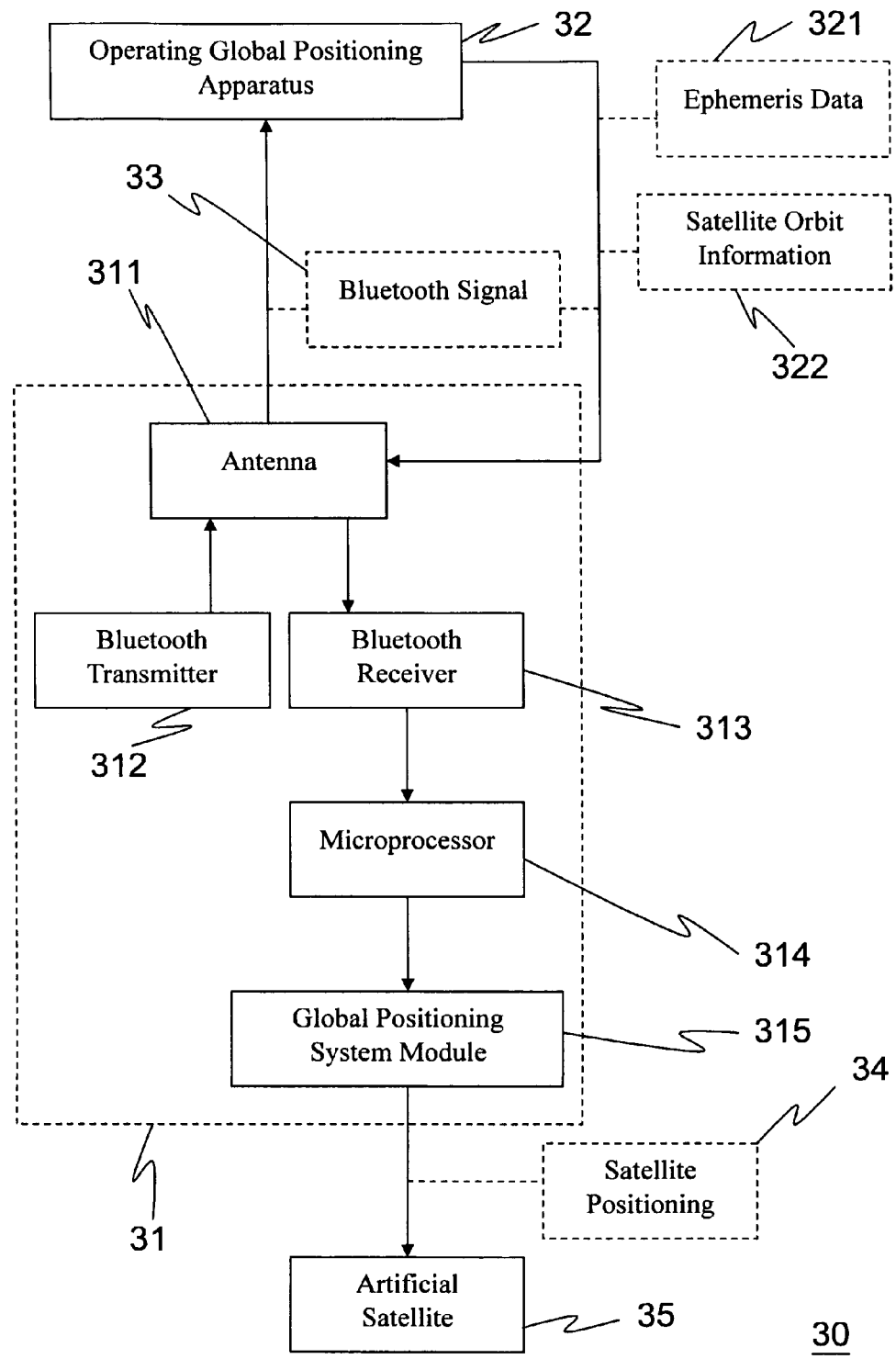
FIG. 3 is a block diagram of an auxiliary satellite positioning system adopting a wireless transmission according to a preferred embodiment of the present invention.

Referring to FIG. 3 for the block diagram of an auxiliary satellite positioning system according to a preferred embodiment of the present invention, the auxiliary satellite positioning system 30 includes an operating satellite positioning apparatus 32 and a positioning satellite positioning apparatus 31, and the positioning satellite positioning apparatus 31 includes an antenna 311, a Bluetooth transmitter 312, a Bluetooth receiver 313, a microprocessor 314 and a global positioning system module 315. The Bluetooth transmitter 312 produces a Bluetooth signal 33 for searching the operating satellite positioning apparatus 32 that contains an ephemeris data 321 and a satellite orbit information 322. The antenna 311 is used for transmitting and receiving the Bluetooth signal 33. The Bluetooth receiver 313 is used for receiving the Bluetooth signal 33 of the operating satellite positioning apparatus 32 from the antenna 311 and converting the Bluetooth signal 33 into the ephemeris data 321 and satellite orbit information 322. The microprocessor 314 receives the ephemeris data 321 and satellite orbit information 322 through the antenna 311 and Bluetooth receiver 313 and sends the ephemeris data 321 and satellite orbit information 322 to the global positioning system module 315. The global positioning system module 315 uses the ephemeris data 321 and satellite orbit information 322 to implement a satellite positioning 34 for the artificial satellite 35.

Figure 4:
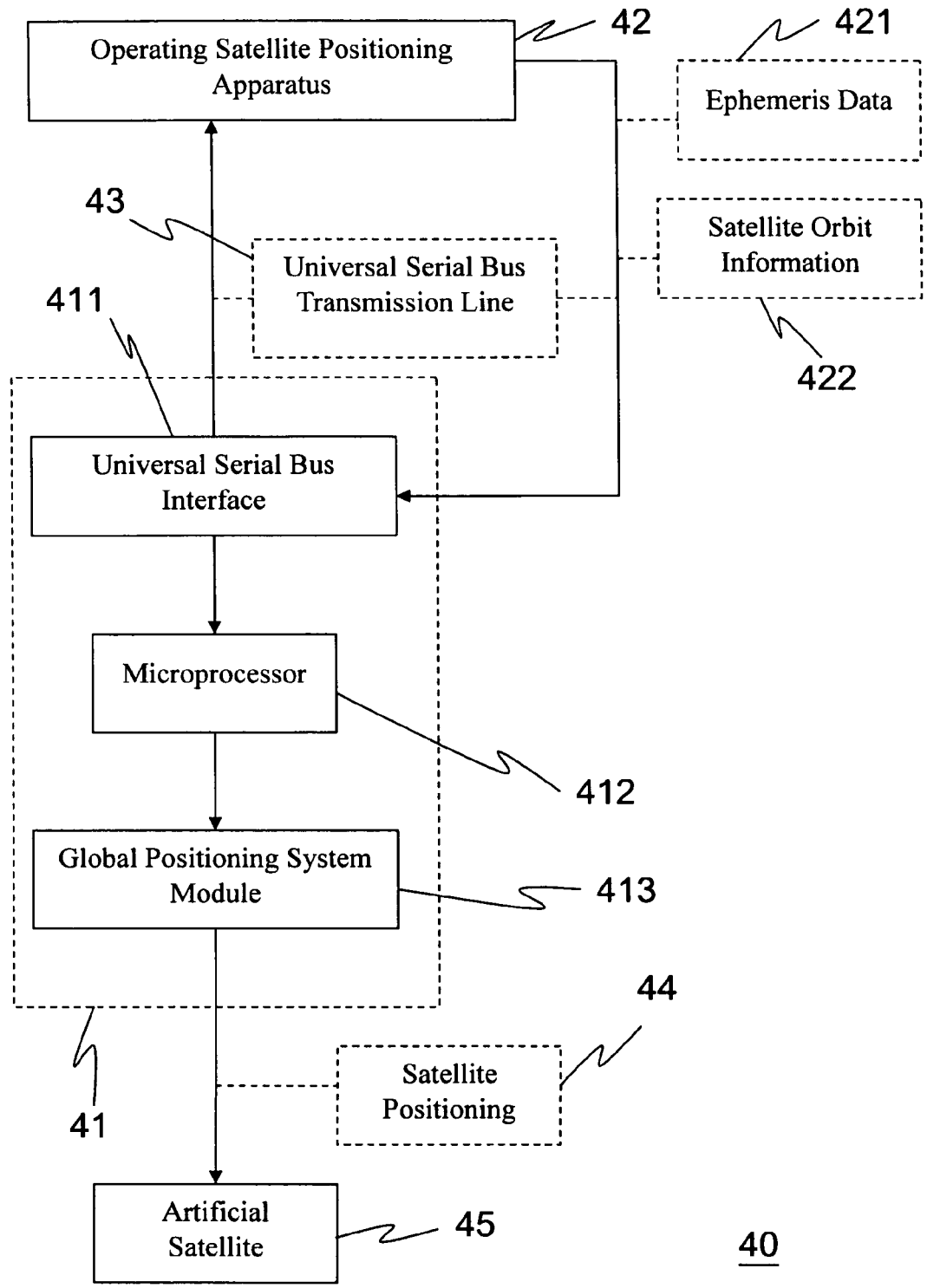
FIG. 4 is a block diagram of an auxiliary satellite positioning system adopting a cable transmission according to another preferred embodiment of the present invention.

Referring to FIG. 4 for the block diagram of an auxiliary satellite positioning system according to another preferred embodiment of the present invention, the auxiliary satellite positioning system 40 includes an operating satellite positioning apparatus 42, a universal serial bus (USB) transmission line 43 and a positioning satellite positioning apparatus 41. The operating satellite positioning apparatus 42 provides an ephemeris data 421 and a satellite orbit information 422, and the USB transmission line 43 transmits the ephemeris data 421 and satellite orbit information 422. The positioning satellite positioning apparatus 41 includes a USB interface 411, a microprocessor 412 and a global positioning system module 413. The USB interface 411 detects whether or not an operating satellite positioning apparatus 42 containing the ephemeris data 421 and satellite orbit information 422 it is connected. If yes, then the ephemeris data 421 and satellite orbit information 422 will be transmitted through the USB transmission line 43. The microprocessor 412 receives the ephemeris data 421 and satellite orbit information 422 through the USB interface 411 and sends them to the global positioning system module 413. The global positioning system module 413 uses the ephemeris data 421 and satellite orbit information 422 to implement a satellite positioning 44 for the artificial satellite 45.

Figure 5:
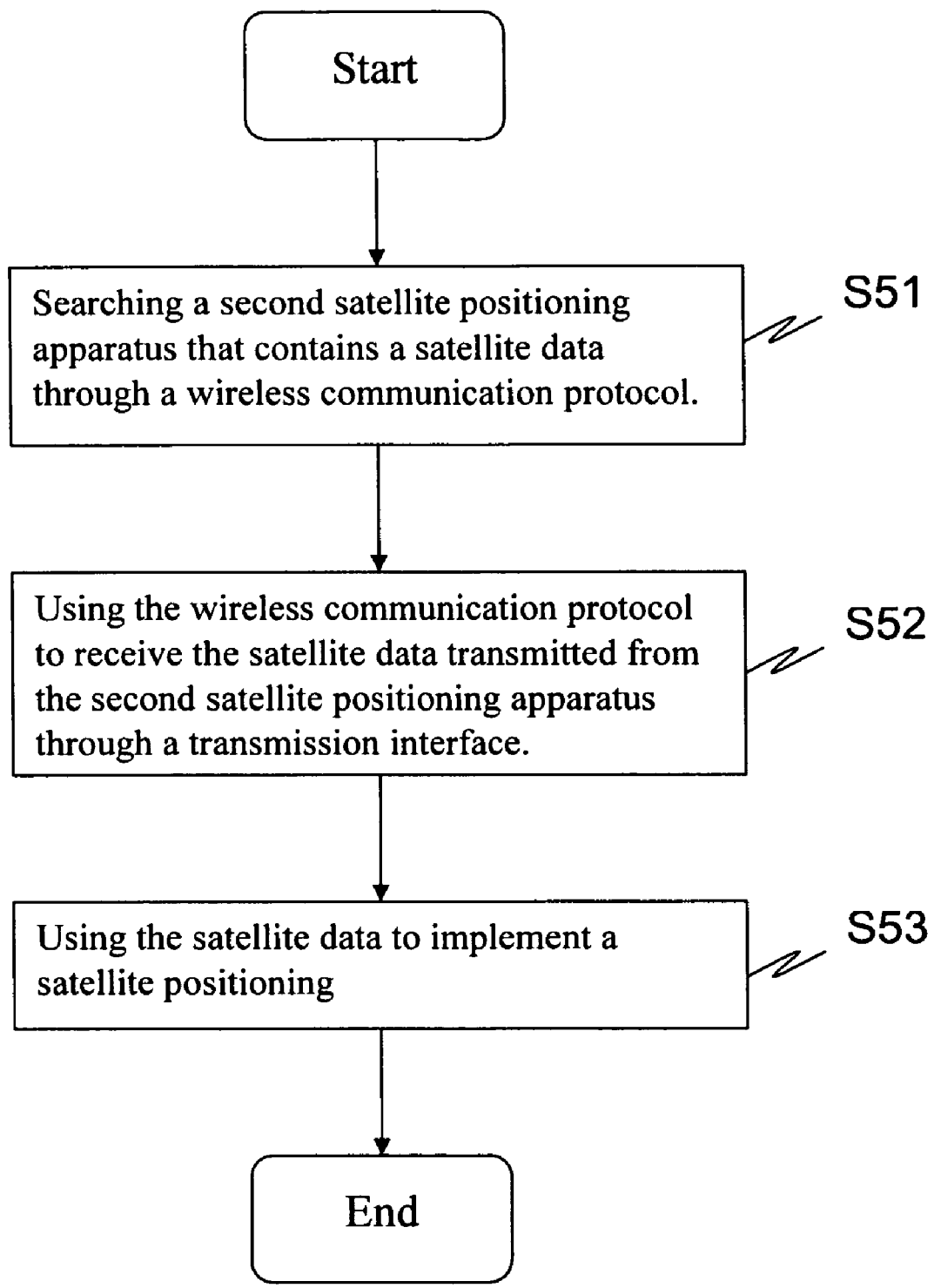
FIG. 5 is a flow chart of an auxiliary satellite positioning system of the present invention.

Referring to FIG. 5 for the flow chart of an auxiliary satellite positioning method in accordance with the present invention, the method is applied for a first satellite positioning apparatus and includes the steps of:

Step S51: searching a second satellite positioning apparatus having a satellite data through a wireless transmission protocol;

Step S52: using a wireless transmission protocol to receive the satellite data transmitted from the second satellite positioning apparatus through a transmission interface; and Step S53: using the satellite data to implement a satellite positioning for the first satellite positioning apparatus.

The wireless transmission protocol is preferably a Bluetooth technology, a wireless LAN 802.11 (Wi-Fi) technology, an Infrared Data Association (IrDA) technology, a near field communication (NFC) technology or an ultra wideband UWB) wireless communication technology; and the first satellite positioning apparatus and second satellite positioning apparatus are preferably portable satellite positioning apparatuses. The satellite data includes an ephemeris data and a satellite orbit information, and the transmission interface could include a cable transmission interface for transmitting the satellite data through a connecting line.

Figure 6:
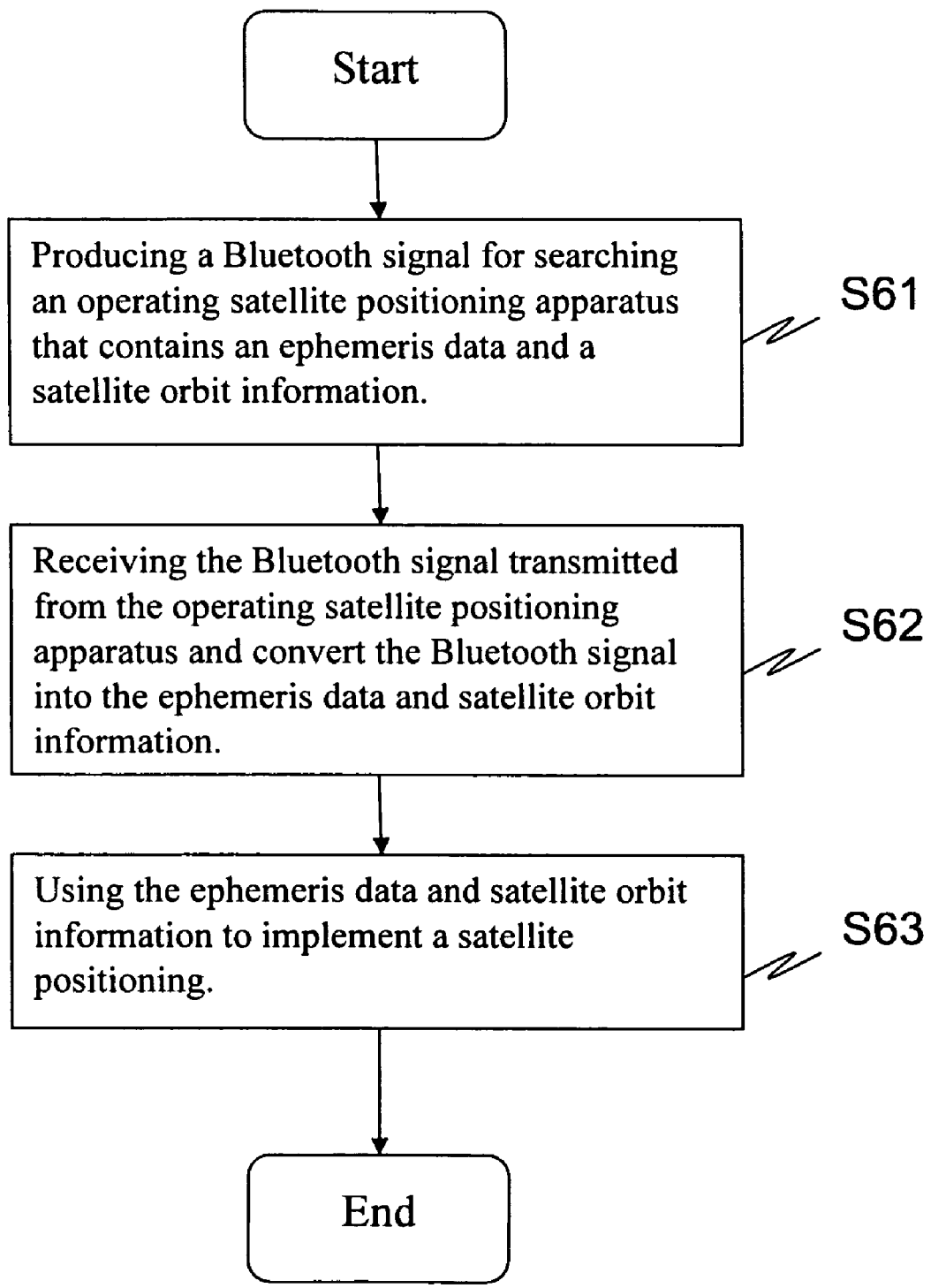
FIG. 6 is a flow chart of an auxiliary satellite positioning method adopting a wireless transmission according to the present invention.

Referring to FIG. 6 for the flow chart of an auxiliary satellite positioning method according to a preferred embodiment of the present invention, the method is applied for a positioning satellite positioning apparatus and includes the steps of:

Step S61: producing a Bluetooth signal for searching an operating satellite positioning apparatus that contains an ephemeris data and a satellite orbit information;

Step S62: receiving the Bluetooth signal transmitted from the operating satellite positioning apparatus and converting the Bluetooth signal into the ephemeris data and satellite orbit information; and Step S63: using the ephemeris data and satellite orbit information to implement a satellite positioning.

Figure 7:
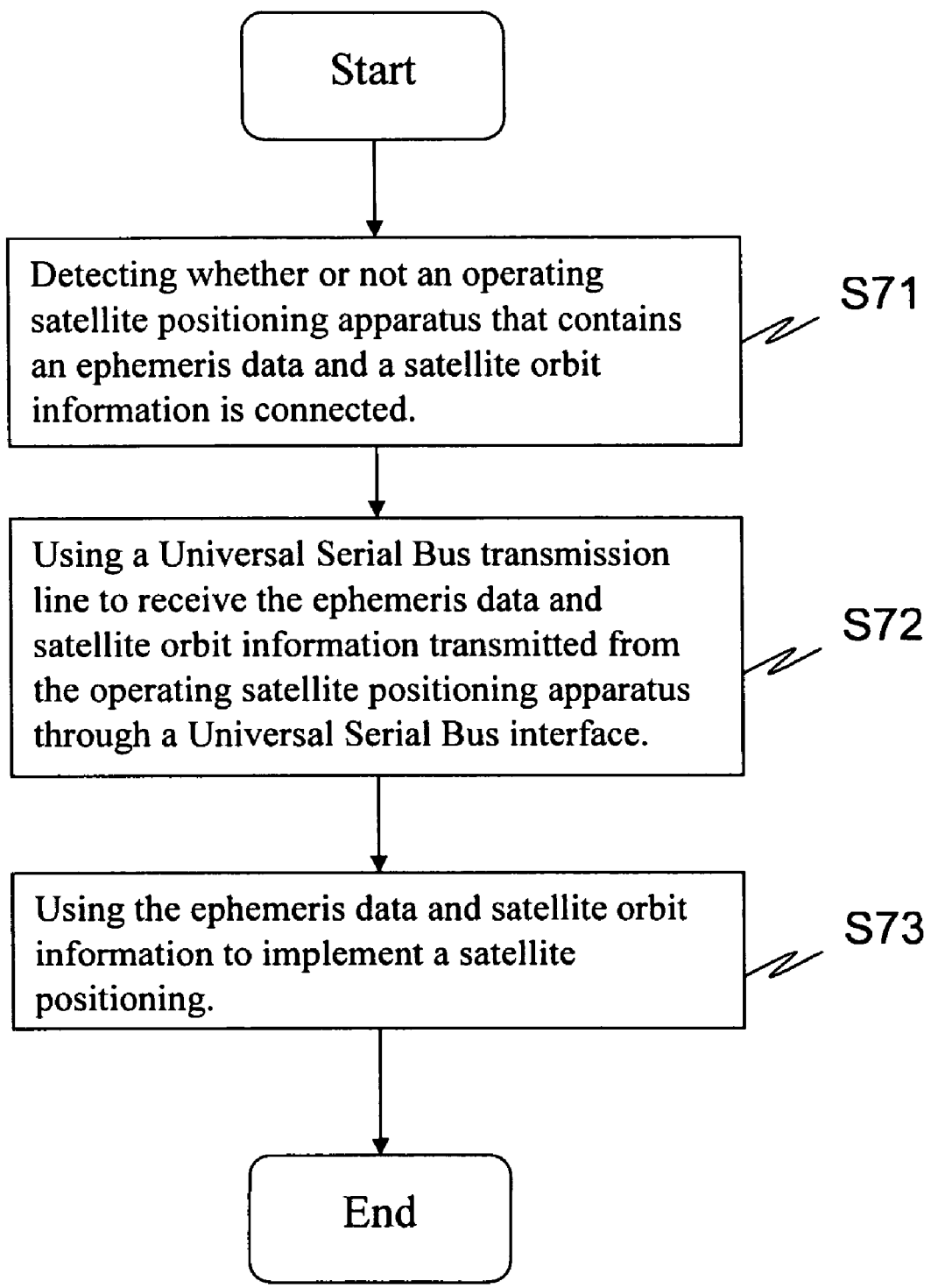
FIG. 7 is a flow chart of an auxiliary satellite positioning method adopting a cable transmission according to the present invention.

Referring to FIG. 7 for the flow chart of a satellite positioning support method according to another preferred embodiment of the present invention, the method is applied for a positioning satellite positioning apparatus and includes the steps of:

Step S71: detecting whether or not an operating satellite positioning apparatus that contains an ephemeris data and a satellite orbit information is connected;

Step S72: using a USB transmission line to receive the ephemeris data and satellite orbit information of the operating satellite positioning apparatus through a USB interface; and Step S73: using the ephemeris data and satellite orbit information to implement a satellite positioning.

Figure 8:
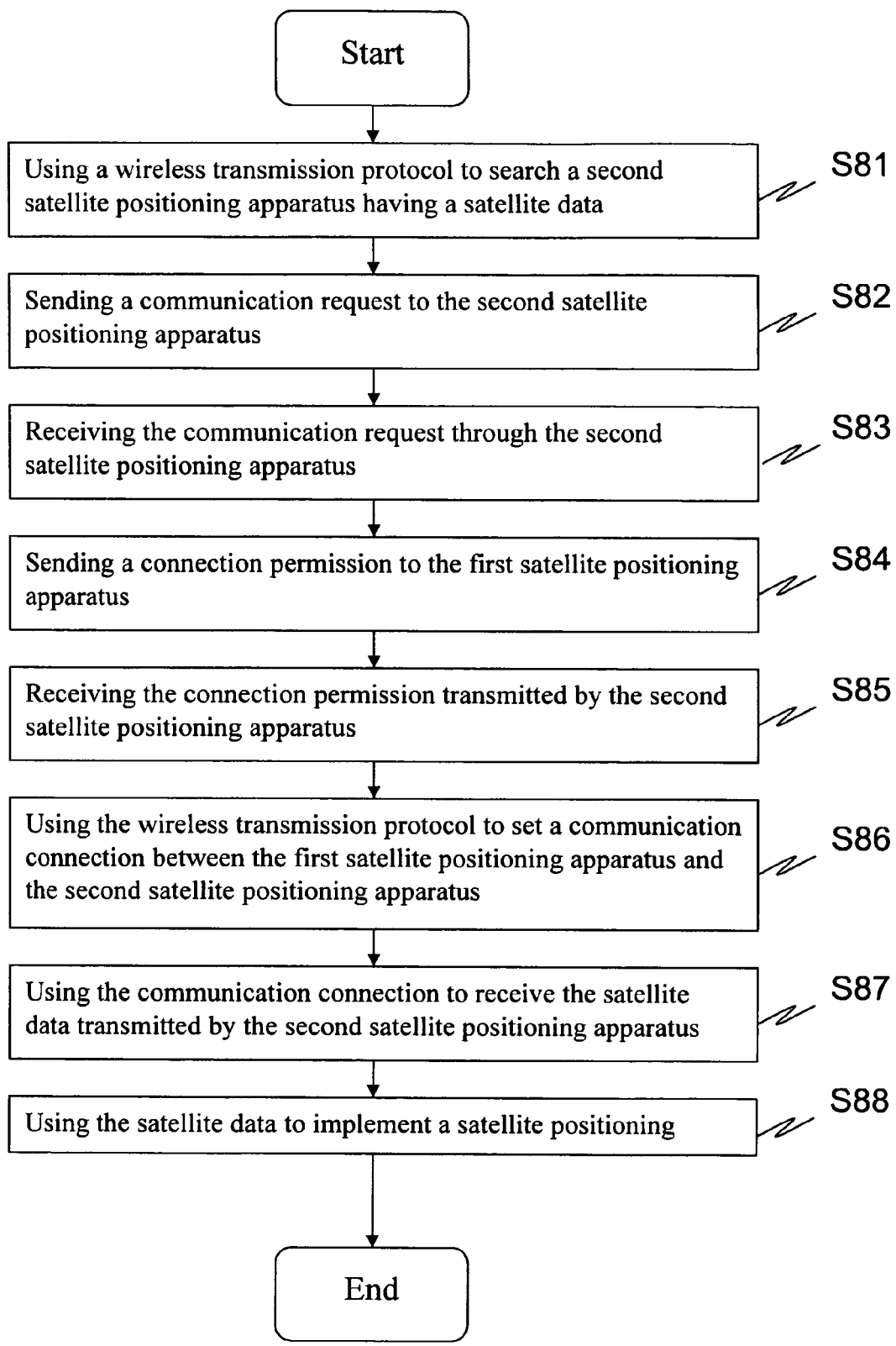
FIG. 8 is a flow chart of another auxiliary satellite positioning method of the present invention.

Referring to FIG. 8, a flowchart of another auxiliary satellite positioning method according to an embodiment of the present invention is illustrated. The method is applied for a first satellite position apparatus and includes the steps of:

Step S81: using a wireless transmission protocol to search a second satellite positioning apparatus having a satellite data;

Step S82: sending a communication request to the second satellite positioning apparatus;

Step S83: receiving the communication request through the second satellite positioning apparatus;

Step S84: sending a connection permission to the first satellite positioning apparatus;

Step S85: receiving the connection permission transmitted by the second satellite positioning apparatus;

Step S86: using the wireless transmission protocol to set a communication connection between the first satellite positioning apparatus and the second satellite positioning apparatus;

Step S87: using the communication connection to receive the satellite data transmitted by the second satellite positioning apparatus; and Step S88: using the satellite data to implement a satellite positioning action.

The wireless transmission protocol is preferably a Bluetooth technology, a wireless LAN 802.11 (Wi-Fi) technology, an Infrared Data Association (IrDA) technology, a near field communication (NFC) technology or an ultra wideband UWB) wireless communication technology; and the first satellite positioning apparatus and the second satellite positioning apparatus are preferably portable satellite positioning apparatuses. The satellite data includes an ephemeris data and a satellite orbit information.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An auxiliary satellite positioning system of a first portable satellite positioning apparatus, comprising:
   a detection module configured to search for a second portable satellite positioning apparatus having a short range wireless transmission protocol and current ephemeris and global positioning satellite orbit data;
   a transmission interface configured to transmit and receive, after the second portable satellite positioning apparatus being detected by the detection module, said current ephemeris and global positioning satellite orbit data directly to and from a detected second portable satellite positioning apparatus using said short range wireless transmission protocol; and
   a positioning module configured to implement a satellite positioning action using said current ephemeris and global positioning satellite orbit data received from said second portable satellite positioning apparatus.

2. The auxiliary satellite positioning system of claim 1, wherein said transmission interface further comprises a cable transmission interface configured to transmit said satellite data through a connecting line.

3. The auxiliary satellite positioning system of claim 1, wherein said positioning module is a global positioning system (GPS) module.

4. An auxiliary satellite positioning method, comprising the steps of:
   providing a first portable satellite positioning apparatus;
   using a short range wireless transmission protocol to search for a second portable satellite positioning apparatus having a communication capability using said short range wireless transmission protocol and having current ephemeris and global positioning satellite orbit data;
   if the second portable satellite positioning apparatus has been detected, using said short range wireless transmission protocol to receive said current ephemeris and global positioning satellite orbit data directly from said second portable satellite positioning apparatus through a transmission interface; and
   using said current ephemeris and global positioning satellite orbit data received from said second portable satellite positioning apparatus to implement a satellite positioning action.

5. The auxiliary satellite positioning method of claim 4, further comprising the step of using a cable transmission interface of said transmission interface to connect to said second portable satellite positioning apparatus and receive said current ephemeris and global positioning satellite orbit data through a connecting line.

6. The auxiliary satellite positioning method of claim 4, wherein the method further comprises a step of providing a global positioning system module to implement said satellite positioning action.

7. An auxiliary satellite positioning method, comprising the steps of:
   providing a first portable satellite positioning apparatus;
   using a short range wireless transmission protocol to search for a second portable satellite positioning apparatus having current ephemeris and global positioning satellite orbit data, the step of searching including:
   a. sending a communication request using said short range wireless transmission protocol;
   b. receiving said communication request by said portable second satellite positioning apparatus;
   c. sending from said portable second satellite positioning apparatus a connection permission signal to said first portable satellite positioning apparatus using said short range wireless transmission protocol; and,
   d. receiving said connection permission signal transmitted by said second portable satellite positioning apparatus by said portable first satellite positioning apparatus;
   after the second portable satellite positioning apparatus has been detected, using said short range wireless transmission protocol to set a direct communication connection between said first portable satellite positioning apparatus and said second portable satellite positioning apparatus;
   using said communication connection to receive said current ephemeris and global positioning satellite orbit data directly from said second portable satellite positioning apparatus; and
   using said current ephemeris and global positioning satellite orbit data to implement a satellite positioning action.

8. The auxiliary satellite positioning method of claim 7, wherein the method further comprises a step of providing a global positioning system module to implement said satellite positioning action.

* * * * *